Nov. 4, 1952 — J. H. DE W. WALLER — 2,616,149
METHOD OF MOLDING IN SITU CONCRETE ARCHED STRUCTURES
Filed Dec. 11, 1947 — 2 SHEETS—SHEET 1
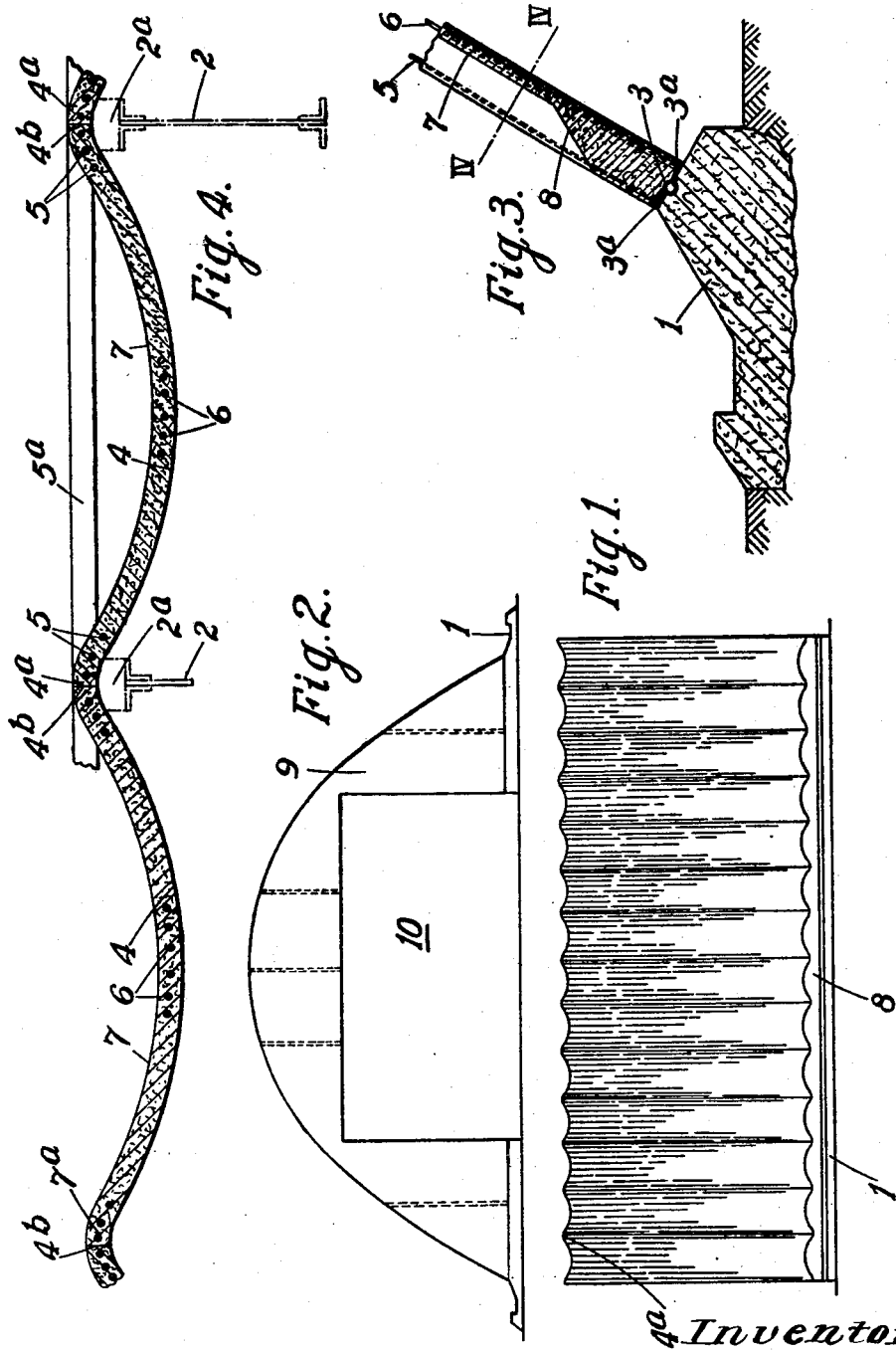
Inventor
J. H. De W. Waller

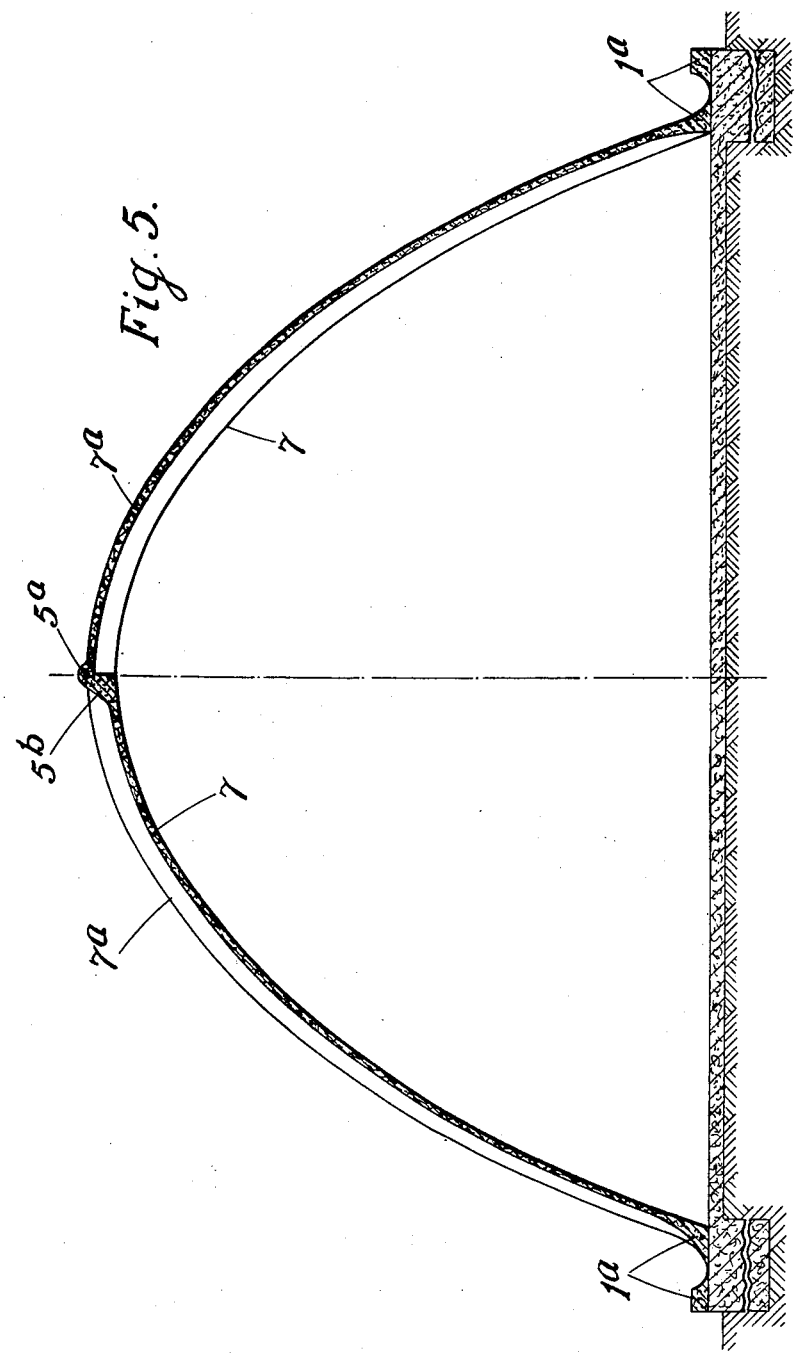

Patented Nov. 4, 1952

2,616,149

UNITED STATES PATENT OFFICE 2,616,149

METHOD OF MOLDING IN SITU CONCRETE ARCHED STRUCTURES

James Hardress de Warrenne Waller, London, England, assignor of one-half to Bowen-Colthurst & Partners Limited, Colchester, England Application December 11, 1947, Serial No. 790,968
In Great Britain January 9, 1941

Section 1, Public Law 690, August 8, 1946
Patent expires January 9, 1961

1 Claim. (Cl. 25—154)

This invention relates to a method of moulding constructions of arch, semi-arch or arch-like form (such as for example hangars or other sheds or buildings, or bridges, culverts or the like, hereinafter referred to as arched structures) carried out in plain or reinforced cement, concrete or like material (hereinafter referred to as concrete).

An object of the present invention is to provide an improved method of construction adapted to expedite erection and reduce costs by eliminating, simplifying or reducing the amount of falsework (such as centring and the usual rigid shuttering or the like) employed.

The invention also affords the advantage that it enables designs to be varied or constructions of different strengths to be produced without any substantial change in the temporary supports, shuttering or the like moulding means.

The invention consists in a method of moulding producing moulded arch elements each of which has a form in cross-section (i. e. transversely of the span) such that its intrados is based substantially on the catenarian curve or presents a convex or angular intrados approximating to the character of a catenarian curve.

The invention also comprises a method of moulding an arched structure composed of a series of adjacent and parallel moulded arch elements of the character indicated in the preceding paragraph and having a common axis (or axes) such that as viewed in longitudinal section of the series a wave-like intrados contour is displayed.

It will be understood that while the catenarian curve is preferred the arch elements may in cross-section have a convex curve of modified form or have an angular form which possesses a depending angular or faceted intrados in cross-section or between the planes of the wave crests which although not following a true catenarian curve approximates thereto. This modified form may exist over the whole of an arch element or may be introduced at certain parts of the arch, such for example as the lower parts.

The several arch elements of which a structure may be composed may be moulded together integrally so that the wave form is continuous from end to end of the structure or of a series of adjacent arch elements, or the arch elements may be formed separate but adjoining, in the planes of the crests of the wave form. Furthermore, each arch element may be moulded in one integral span or such may be moulded in arcuate sections joined together end to end by means of bolts, self-accommodating hinge-like joints or other suitable means.

The invention also includes a method of construction of an arched structure in situ comprising erecting temporary arch ribs at intervals according to a predetermined pitch, supporting on the ribs flexible sheet or web material in such a manner that the material sags in curves of catenarian form, and adapted to act as self-accommodating intrados shuttering, preferably laying steel or other reinforcement over the flexible shuttering, moulding concrete or the like to the desired thickness upon the shuttering to form separate but adjoining arch elements or an integral continuous arch surface (or surfaces) of wave-like form, and finally removing the temporary ribs.

Alternatively, an arched structure according to the invention may be built up of precast arch elements or arcuate sections which, when fitted together end to end, form an arch element (or a series of elements) and the invention includes a method of precasting arch elements or sections for assembly in an arched structure comprising supporting flexible sheet or web material upon moulding ribs arranged parallel and spaced according to the width for the arch elements or sections, in such a manner that the flexible material sags in the form of a catenarian curve (or curves) and is adapted to act as a self-accommodating intrados shuttering, preferably laying steel or other reinforcement over flexible shuttering, moulding concrete to the desired thickness upon the shuttering, and finally removing the arch elements or sections, when set, from the ribs.

The amount of sag provided for the flexible shuttering and the spacing of the temporary or moulding ribs may be greater or less according to the effective depth of the arch element desired, and it will be appreciated that the nature of the flexible shuttering employed enables structures of different strength to be moulded by simple adjustments of the amount of sag and pitch of the rib supports.

The invention may be applied to arch structures the longitudinal form or span of which is based on a catenarian curve, such for example, as described in our prior British specification No. 382,610 and illustrated in Figures 3 and 4 thereof, in which case the arch structure will have a catenarian form both longitudinally and in cross-section.

In the accompanying drawings:

Figures 1 and 2 are respectively a diagrammatic side and end elevation of a hanger or arched shed constructed according to one form of the invention.

Figure 3 is a fragmentary section showing a footing and the lower part of the arch form of the hangar shown in Figures 1 and 2.

Figure 4 is a fragmentary section taken on the lines IV—VI of Figure 3 showing the catenarian curve form of each arch element in cross section (i. e. between the ribs) and the wave-like form presented by a series of adjoining arch elements for the structure of the hangar as viewed in longitudinal section of the hangar.

Figure 5 is a cross-sectional elevation of the hangar seen in Figures 1 and 2 with a modified footing for the arch. In this figure, the left hand half is taken through a wave trough while the right hand half is taken through the crest form.

In carrying the invention into effect according to one convenient mode as described by way of example in reference to the erection of the hangar illustrated in Figures 1, 2 or 5 of the drawings, footings such as 1 or 1a are laid and upon such are erected a parallel and coaxial series of girder arches or ribs 2 (Figure 4) adapted temporarily to support the flexible shuttering on which the moulding is to take place. The span or longitudinal form of the girder arches or ribs 2 may have a catenarian curve as seen in Figures 2 and 5, for example, or the arch may longitudinally be of semicircular, multi-centred or of angular form. If desired, shaped wooden beds 2a may be mounted on the external surface of the ribs 2 to form a seating for the wave crests. In order that the foot or base of the moulded arch elements may have a self-accommodating hinge-like mounting the footing is formed with a semicylindrical groove or depression moulded in it in a plane parallel to the axis of the arch for the reception of a cylindrical hinge tube or bar 3.

The ribs 2 are spaced at intervals corresponding with the desired pitch of the wave crests in the finished work. Over these ribs are laid continuous sheets or webs 4 (Figure 4) of fabric-reinforced bitumenized paper, or preferably a flexible woven fabric, to form a flexible shuttering for the moulding operation, the fabric being laid in such a manner that it sags in catenarian curves transversely of the arch and between the ribs 2 (as seen in Figures 1 and 4), the amount of sag allowed corresponding with the effective depth required for the moulded arch elements, i. e. the distance between a straight line joining the wave crests and a parallel tangent to the catenarian curve.

Where it is intended to provide reinforcement such may be introduced at the wave crests 4a and/or reinforcement may be embedded in the troughs and at the crests of the wave form as indicated at 5 and 6 (Figure 4), or alternatively, or as a supplement diagonal or transverse reinforcement may be introduced into the wave form.

The reinforcement 6 also serves to hold the flexible shuttering in the region of the footings and downward portions of the arch to the correct curvature or a curvature corresponding to that naturally assumed by the flexible shuttering at the upper portion of the arch.

If desired, supplementary wires (not shown) may be spaced between the wires 6 and 5 to provide additional means adapted to assist the shuttering to retain or conform to the required curvature. The reinforcement 6 and the supplementary wires may be tensioned over the shuttering and this tensioning may have the effect, more particularly at the lower portions of the arch, of causing it to assume an angular form or present an intrados which, although based on the catenarian curve, presents facets instead of a continuous curve.

If desired, a continuous longitudinal reinforcement, such as fabric netting, may also be embodied or may be used alone instead of the metal reinforcement referred to above.

The concrete of the trough and crest arches 7, 7a is preferably laid by aid of a trowel, or partly by pouring and partly by trowelling, or the deposition of concrete may be effected by aid of a cement gun or any other means may be used for the moulding operation as desired. The thickness of the moulded concrete 7 need not be great and may be varied according to requirements. A thickness of 1½ in. to 2 in. has been found suitable for ordinary requirements. The moulding may be effected so that the curve or form of the extrados corresponds with the wave form of the intrados of the structure, or if desired the troughs may be filled in to crest height or to any intermediate level.

As already indicated, the wave form may be continuous, that is to say it may be molded integrally from arch element to arch element to produce a continuous integral wave form, but it is preferred to divide each troughed arch from the next arch so as to avoid the transmission of undue strains from one element to another. If desired, the arch elements may be moulded in pairs or short series. The division 4b (Figure 4) at the wave crests may be packed or grouted and for this purpose grooves or gulleys may be moulded in the crest edges.

The base of each arch may be moulded solid as at 8 (Figure 3 or 5) by the aid of suitable shuttering in the ordinary way. The solid base may be moulded in situ over the tubes 3 or where precast units are used grooves may be moulded in the feet of the units so as to fit the tubes 3 when the precast units are placed in position. In either case tapering clearances as at 3a may be formed and left for filling with composition so that a hinging accommodation movement may take place.

An advantage of the arched construction having the wave form such as seen in Figure 1 is that it reduces the likelihood of cracks forming transversely to the longitudinal axis of the arch since the multiplicity of wave affords a certain amount of elasticity or accommodation for movement or expansion or contraction of the elements.

In order to provide in certain cases for longitudinal strains or stresses, strut or tie members 5a may be introduced at intervals around the arch form of the elements and positioned between the wave crests, these struts or ties being moulded into the crests of the waves, or where reinforced struts or ties are used the reinforcement is moulded into the wave crests, or if desired the reinforcement may be secured to the reinforcement 5 in the wave crests.

It is preferred to embody a tie member 5a at the ridge of the span as seen in Figure 5 and to mould concrete 5b around the member in the troughs of the wave form.

When the moulded concrete has set sufficiently the temporary ribs may be removed and, if desired, the flexible shuttering may be stripped from the intrados surfaces, or the shuttering may be allowed to remain in position, in which case it may afford additional impermeability when a waterproof flexible material has been employed such as the bitumenized reinforced paper or felt referred to above.

Instead of employing a paper or impervious shuttering material a flexible shuttering in the form of vegetable fibre mesh may be employed which may be incorporated in the concrete or moulding material as a reinforcement. In this case in trowelling or moulding the concrete a certain amount penetrates and is forced through the mesh to the intrados side thereof so that the mesh becomes automatically embedded in the concrete towards its convex side.

The vertical ends of the structure may be enclosed by any suitable sheeting material 9 and the front end may be formed with a suitable door opening 10 to receive a sliding door, curtain or the like closure.

In a similar manner to that above described in connection with hangars, the invention may be applied to other structures, the necessary alterations in design and size of the temporary ribs being made, while the spacing of the ribs and the amount of sag in the flexible shuttering may also be adjusted to accord with the needs of the particular structure to be erected.

I claim:

A method of erecting in situ a concrete arched structure for a hangar or other building consisting in forming an arched shell extending from footing to footing in a curve simulating a catenary and extending axially in a wave form, comprising the steps of setting up temporary arched rib supports at intervals equal to those predetermined for the pitch of the wave crests, hanging flexible shuttering material between one wave crest and the next throughout the axial extent of the structure with sufficient fullness in the material such that it hangs in catenaries of substantial amplitude relative to the predetermined pitch and will automatically serve to mould the intrados of the wave troughs to the said catenaries, laying metal reinforcing members lengthwise in the troughs of said material to follow the form of said arch from footing to footing, plastering concrete upon the shuttering material and over the wave crests in such a manner as to embed said members in the concrete, and thereafter plastering additional concrete on the outside to form an extrados wave form the amplitude of the catenary troughs of which is somewhat less than that of the intrados of said troughs, and, when the concrete has set, removing said temporary arched rib supports.

JAMES HARDRESS
DE WARRENNE WALLER.

REFERENCES CITED

The following references are of record in the file of this patent:

UNITED STATES PATENTS

| Number | Name | Date |
| --- | --- | --- |
| 1,097,915 | Church | May 26, 1914 |
| 1,241,945 | Fletcher | Oct. 2, 1917 |
| 1,841,586 | Garrett | Jan. 19, 1932 |
| 2,096,629 | Farrar et al. | Oct. 19, 1937 |
| 2,129,932 | Huddleston | Sept. 13, 1938 |
| 2,267,912 | Hain | Dec. 30, 1941 |
| 2,270,229 | Neff | Jan. 20, 1942 |
| 2,326,010 | Crom | Aug. 3, 1943 |
| 2,469,603 | Le Tourneau | May 10, 1949 |

FOREIGN PATENTS

| Number | Country | Date |
| --- | --- | --- |
| 382,610 | Great Britain | Oct. 17, 1932 |
| 669,990 | France | 1939 |